(12) United States Patent
Gros D'Aillon et al.

(10) Patent No.: US 7,659,515 B2
(45) Date of Patent: Feb. 9, 2010

(54) ELECTROMAGNETIC AND PARTICLE DETECTOR WITH REDUCED NUMBER OF CONNECTIONS

(75) Inventors: Eric Gros D'Aillon, Brie et Angonnes (FR); Loïck Verger, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 11/575,535

(22) PCT Filed: Sep. 12, 2005

(86) PCT No.: PCT/FR2005/050729

§ 371 (c)(1),
(2), (4) Date: Sep. 15, 2008

(87) PCT Pub. No.: WO2006/032807

PCT Pub. Date: Mar. 30, 2006

(65) Prior Publication Data

US 2009/0045345 A1    Feb. 19, 2009

(30) Foreign Application Priority Data

Sep. 22, 2004    (FR)    .................................. 04 09996

(51) Int. Cl.
*G01T 1/24* (2006.01)
(52) U.S. Cl. ................................. 250/370.01
(58) Field of Classification Search ............. 250/338.4, 250/370.01, 370.02, 370.11, 370.13
See application file for complete search history.

(56) References Cited

U.S. PATENT DOCUMENTS

| 6,028,313 A | 2/2000 | McDaniel |
| 6,621,084 B1 | 9/2003 | Wainer et al. |

FOREIGN PATENT DOCUMENTS

| GB | 2200246 | 7/1988 |
| WO | WO00/14573 | 3/2000 |

*Primary Examiner*—David P Porta
*Assistant Examiner*—Mark R Gaworecki
(74) *Attorney, Agent, or Firm*—Heslin Rothenberg Farley & Mesiti P.C.

(57) ABSTRACT

A detecting device comprises at least one 2-dimensional set of elementary sensors of the semiconductor type for transforming energy of radiation to be detected into electric signals. Each elementary sensor is provided on one side with an anode and on the opposite side with a cathode adapted to be electrically connected on a circuit for reading and operating on the signals. The anodes are electrically interconnected to constitute a plurality of anode subsets electrically connected at least in pairs to a measuring anode path looped on said reading and operating circuit. Each anode is connected to two separate measuring anode pats. The cathodes are electrically interconnected to constitute adjacent cathode subsets, each cathode subset being electrically connected to a measuring cathode path. The anodes belonging to two anode subsets and connected to a common anode path are associated with sensors whereof the cathodes belong to separate cathode subsets.

18 Claims, 5 Drawing Sheets

ELECTROMAGNETIC AND PARTICLE DETECTOR WITH REDUCED NUMBER OF CONNECTIONS

CROSS REFERENCE TO RELATED APPLICATIONS

This application is a 371 filing of international application PCT/FR2005/050729, filed on Sep. 12, 2005 and published, in French, as international publication WO 2006/032807 on Mar. 30, 2006, and claims priority of French Application No. 0409996 filed on Sep. 22, 2004, which applications are hereby incorporated by reference herein, in their entirety.

FIELD OF THE INVENTION

The present invention relates to a device for detecting particle radiation or electromagnetic wave radiation. Such a device is commonly used, firstly, primarily to detect this type of wave or particles for scientific purposes in particular and, secondly, to form images of certain parts of an object on the basis of rays transmitted through or diffracted or reflected by that object after irradiation in order, for instance, to analyze the chemical composition of that object.

DESCRIPTION OF THE PRIOR ART

The use of a two-dimensional detecting device, generally of the array type, in order to form images is known, especially in the field of X-ray or gamma ray imaging. Classically, the detecting device or detector is bounded or contained in one plane. Actual detection is obtained by means of juxtaposed elementary sensors that are contained in said plane and interact with the radiation that is to be detected. The use of detectors making it possible to digitise the images formed, i.e. encode them as a sequence of data bits, is also known.

Each elementary sensor of such a detector traditionally has a parallelepiped shape. Each elementary sensor is made of a semiconductor material. In addition, each elementary sensor is provided with an anode separately mounted on one of its sides and a cathode separately mounted on the side opposite to that which supports the anode. This anode and this cathode are brought to a potential that is sufficient to allow collection of the electric signals generated by the elementary sensor subsequent to its interaction with an electromagnetic wave or particle.

Because the elementary sensors are usually juxtaposed at regular intervals in the form of a two-dimensional array, this type of detector is often referred to as an array detector.

The elementary sensor can also be spatially defined solely by the geometry of its anode and/or cathode. In this case, all the sensors assembled in order to form an array detector have a common sensor material that constitutes a single unit having the same dimension as the detector.

Each elementary sensor of the array detector converts the incident ray, electromagnetic waves or particles into electric signals, the intensity of which is a function of the energy of the incident ray. These signals are transmitted to the electrodes, anodes and cathodes of the elementary sensor in a known manner. These electrodes are connected to anode and cathode paths that capture these elementary electric signals and transfer them to an electronic loop for processing these signals.

In order to produce a digital image, this electronic processing loop processes this electric signal in one or more stages such as, for example, amplification, filtering and encoding as data bits in order to make the signal usable by an operating means such as a computer or a display such as a monitor.

In order to reconstitute a digital image representative of the observed scene, it is therefore indispensable to precisely localise each of the elementary sensors that interacted and therefore outputted an elementary electric signal. Thus, all the electric signals outputted by the elementary sensors, after possible processing of each of them and precise localisation of the sensors that outputted the signals, form a representative digital image which can then be analysed, read or recorded. This image can then be displayed on a monitor or be analysed by a computer.

Figure 1:
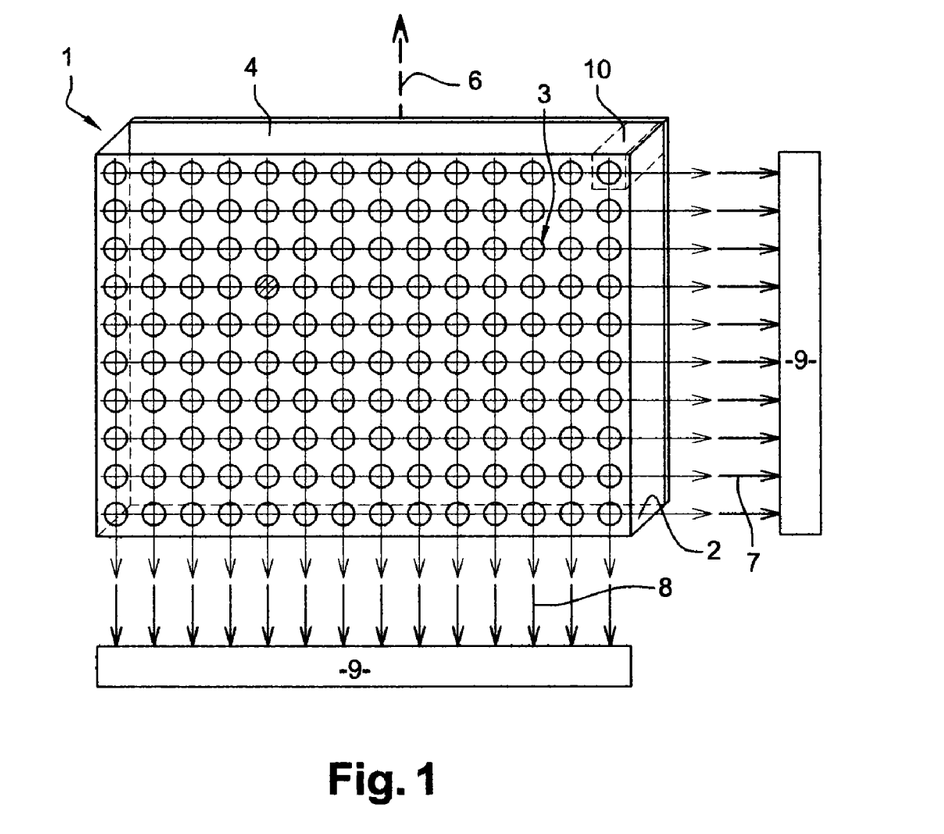
FIG. 1 is a schematic view of a detector according to the prior art.

An array detector of the type in question, more especially intended for detecting infrared radiation, is described, for instance, in Document GB-A-2.200.246. FIG. 1 in that document shows that the anode associated with each of the elementary sensors is connected to its own measuring anode path which comprises an electronic processing loop for digitising the signal that is outputted by the elementary sensor. All the cathodes of the elementary sensors are interconnected and connected to a single measuring cathode path. The number of measuring anode paths that have to be provided therefore equals the number of elementary sensors and, consequently, the same number of electronic processing loops must be provided.

Depending on the intended ultimate use of the image, the number of elementary sensors can be 10,000 for example in the case of a square array of 100×100 elementary sensors, or even 4,000,000 in the case of an array of 2,000×2,000 elementary sensors. This is equivalent to a total of 10,001 or 4,000, 001 measuring, anode and cathode paths.

This multiplicity of anode paths causes significant difficulties in terms of fabricating connections and consequently involves increased manufacturing costs, especially against a background of increasing miniaturisation of detectors and hence elementary sensors. In addition, the overall size of the detector increases in particular as a function of the number of measuring paths and the electronic processing loops that are often associated with them.

Figure 3:
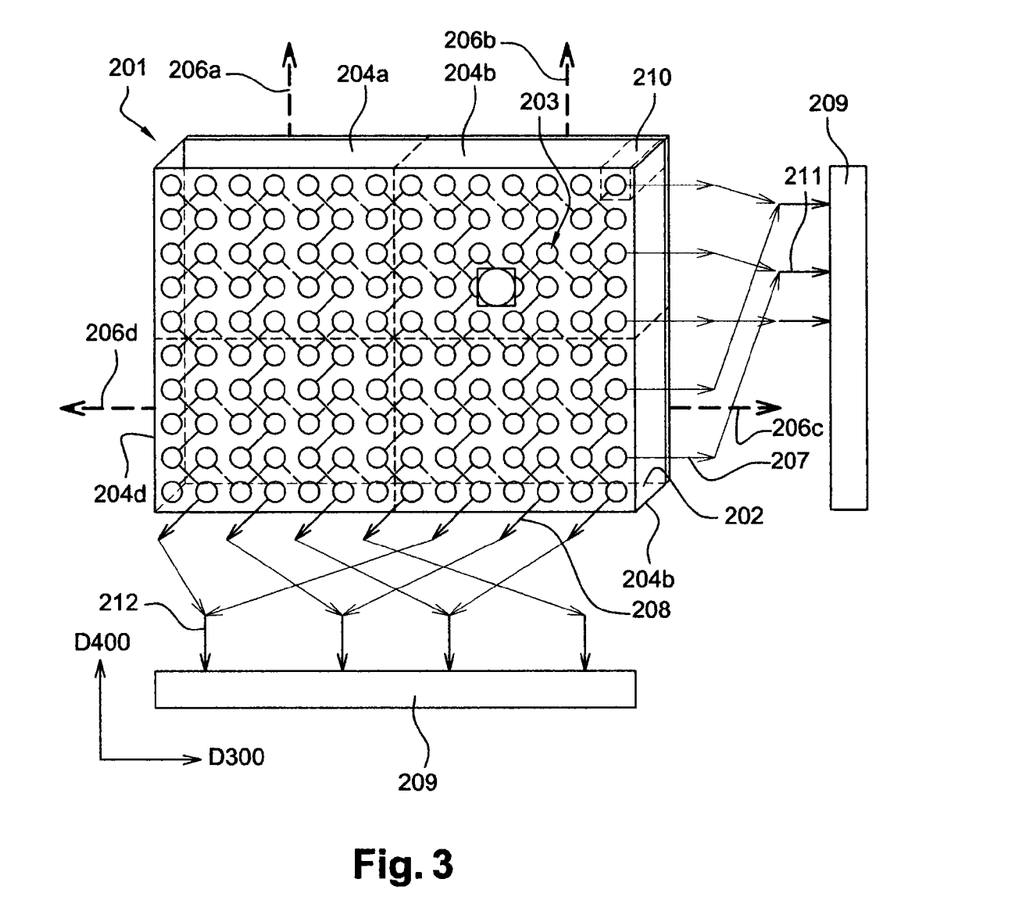
FIG. 3 is a view, similar to FIG. 2, of a second embodiment of the invention.
Figure 5:
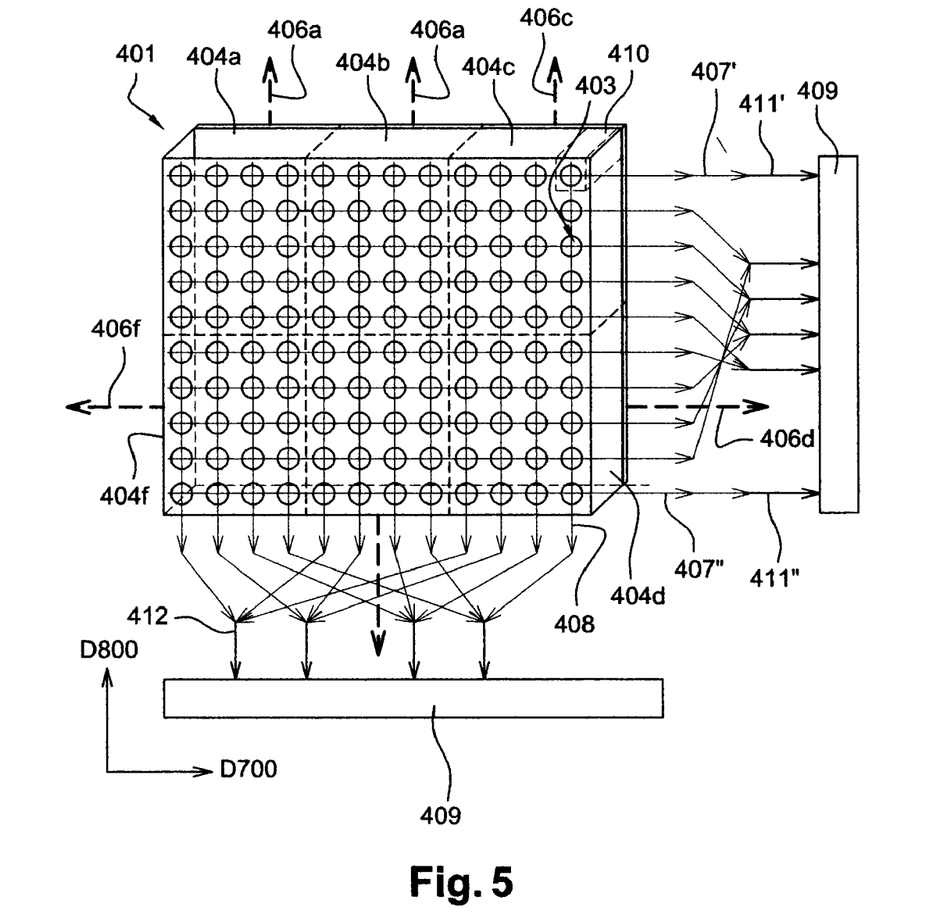
FIG. 5 is a view, similar to FIG. 2, of an alternative version of the first embodiment of the invention.

This is why another type of detector such as that shown in FIGS. 3 and 5 of above-mentioned Document GB-A-2.200.246 has been proposed. One of the objects of this type of detector is to reduce the number of measuring paths required in order to form a digital image. In the example described in those Figures, several anodes are interconnected in order to form a homogeneous anode subset. Each anode subset, generally having a straight channel shape, is equivalent to one measuring anode path. This is also associated with an electronic loop for processing the elementary signals.

Each subset of sensors thus defined therefore forms a row or column of the array of elementary sensors in one or the other main directions of this array respectively. Each elementary sensor is therefore connected to two anode channels which respectively form the row and column of the array at the intersection point of which this sensor is located. The number of measuring anode paths required for detection purposes is thereby reduced and now equals the total number of rows and columns of the array that constitutes the detector, for example 200 for an array of 100×100 elementary sensors or 4,000 for an array of 2,000×2,000 elementary sensors or pixels.

To reconstitute a digital image representative of the observed object or scene, it is necessary to precisely localise every elementary sensor that outputs a signal. In order to localise such a sensor in such an anode-channel configuration, reading and processing the electric signals that the sensor outputs in the two channels and, by extension, on the two measuring anode paths to which it is connected, i.e. its row and its column in the array, is known. Every sensor in the array is thus associated respectively with a coordinate in each of the two main directions of the array. These two coordinates therefore make it possible to unambiguously identify the elementary sensor struck by the incident ray.

Thus, in such an array-type detector, several anodes (3) each associated with an elementary sensor (10) made of a semiconductor material (2) are interconnected respectively by similar anode subsets consisting, in this case, of straight anode channels (7, 8) in each of the two main directions (D1, D2) of the array. Each anode channel (7, 8) is connected to a single measuring anode path (11, 12) which comprises an electronic loop for processing the elementary signal (not shown). Each anode channel (7, 8) therefore forms a row or a column of the array of elementary sensors. Each elementary sensor (10) is connected to two anode channels (7, 8) which, respectively, form the row and column of the array at the intersection point of which this sensor is located. Receiving a signal on row (7) and column (8) unambiguously determines the location where the elementary sensor that outputted the signal is located. In the example in FIG. 1, the number of measuring paths (7, 8) required for detection purposes therefore equals the total number of rows, in this case ten, and columns, in this case fourteen, i.e. a total of twenty four besides the cathode path (6) required for looping the measuring circuit.

As shown in FIG. 1, the operating circuit can unambiguously localise the elementary sensor struck by the incident ray and, by totaling the incident rays that interacted with several elementary sensors (10), can reconstitute a digital image that is representative of the observed scene.

Nevertheless and with the aim of simplifying and rationalising the fabrication stages involved in producing such detectors and in an attempt to reduce the overall size of the components required in order for them to operate and, in this case, the interfacing connectors, especially in relation to miniaturisation of said detectors, there is a need to achieve a still more drastic reduction in the number of measuring paths.

The present invention is part of such research and proposes a detector that substantially reduces the extent of the technical and economic drawbacks mentioned above. In fact, it makes it possible to reduce the number of measuring paths needed in a detecting device of the type in question.

SUMMARY OF THE INVENTION

The object of the invention is therefore to propose an electromagnetic and particle detecting device having structural features that make it possible to achieve efficient detection at an affordable manufacturing cost.

According to a first embodiment, the invention concerns a radiation, particle or electromagnetic detecting device comprising a least one two-dimensional set of elementary sensors. Each elementary sensor is of the semiconductor type and intended for transforming the energy of the radiation to be detected into electric signals. In addition, each of the elementary sensors is provided on one of its sides with an anode and on the opposite side with a cathode. The anode and the cathode are designed to be electrically connected on a circuit for reading and operating on the signals.

According to the invention:
  the anodes are electrically interconnected so as to constitute a plurality of anode subsets which are electrically connected at least in pairs to a measuring anode path which is designed to be connected to the reading and operating circuit,
  each anode is connected to two separate anode paths,
  the cathodes are electrically interconnected so as to constitute adjacent cathode subsets which are each electrically connected to a measuring cathode path,
  the anodes belonging to two anode subsets connected to a common anode path are associated with elementary sensors whereof the cathodes belong to separate cathode subsets.

In other words, the detector that is the subject of the invention consists of parallel anode subsets connected at least in pairs to a common measuring anode path. In addition, all the cathodes are interconnected in groups so as to form separate adjacent cathode subsets, each of them being connected to a measuring cathode path. Each anode is connected to two separate anode paths respectively in both the two main directions of the two-dimensional set.

Thus, when incident radiation interacts with a specific elementary sensor, the latter generates an electron cloud that is captured at least partly by the anode with which the sensor is associated and this is materialised by an electric signal at the level of the anode. This electric signal travels via the two anode subsets that include this sensor, the latter being located at the point where a row and a column of the array detector intersect. The electric signal is then received by two separate measuring anode paths, one for each dimension of the array set.

Because each anode path connects at least two anode subsets that extend in the same direction, for example two rows or two columns, it is impossible for the operating circuit to localise precisely, within the array set, the elementary sensor that interacted with the incident ray and, on that basis, form a representative image of the observed scene. In fact, as is clearly evident in FIG. 2, there are at least four elementary sensors at the points where the anode subsets belonging to the two measuring anode paths receiving an electric signal intersect. The electric signals received on these two anode paths originate from only one of these four sensors. Connection to a measuring anode path that is common to several anode subsets which extend in the same direction of the array set therefore creates ambiguity or uncertainty in terms of localisation or even "degeneracy" to use the specialist term employed by those skilled in the art.

However, in contrast to detectors according to the prior art described earlier, all the cathodes of the detector that is the subject of the invention are not connected to the same measuring cathode path. In fact, all the cathodes are segmented into several separate cathode subsets which therefore have no cathode that is common to them. In addition, each cathode belongs to one and only one cathode subset. Finally, the detector is designed so that the anode subsets of a single measuring anode path are necessarily dependent on separate cathode subsets.

Thus, the cathode signal outputted by the cathode of the elementary sensor is received on a single cathode read path. According to the invention, the anodes belonging to two anode subsets connected to a common anode path are associated with sensors whereof the cathodes belong to separate cathode subsets. One can therefore determine, in each main direction of the array set, the two anode subsets to which the sensor that outputs the signal belongs, thus precisely localising this sensor at the point where these two anode subsets intersect.

On the basis of the electric signals received on the anode and cathode paths, one can therefore eliminate any uncertainty regarding localisation of the elementary sensor that outputted these signals.

Because of the way the anodes and cathodes are connected, a detector in accordance with the invention requires fewer measuring anode paths than detectors according to the prior art because several anode subsets are grouped together on a single measuring anode path. Even after adding to these anode paths the measuring cathode paths that are indispensable for eliminating localisation uncertainty, the total number of measuring paths is less than that of a detector according to the prior art.

In one advantageous form of this first embodiment of the invention, the number of cathode subsets equals the product of the number of anode subsets that are connected to a common measuring anode path in one of the main directions of the array set times the number of anode subsets connected to a common measuring anode path in the other main direction of the array set.

The total number V of measuring channels required is then determined by the following equation:

$$V = N/n + M/m + n \cdot m$$

where:
- N is the number of anode subsets in the first main direction of the array and therefore the number of rows of said array;
- M is the number of anode subsets in the second main direction of the array and therefore the number of columns of said array;
- n is the number of anode subsets connected to a common anode path in the first main direction of the array,
- m is the number of anode subsets connected to a common anode path in the second main direction of the array,
- the product n×m gives the number of cathode subsets required in order to eliminate the localisation uncertainty mentioned earlier.

In one special case of this embodiment of the invention, the anode subsets are connected in pairs to said measuring anode paths and the cathodes are grouped together in four separate adjacent cathode subsets. This particular embodiment of the invention requires very few measuring paths in order to form a representative image. For example, for a detector consisting of 100×100 elementary sensors, i.e. one where N=M=100 and n=m=2, only 104 (50+50+4) measuring paths are required, whereas detectors according to the prior art described above require 10,001 and 201 measuring paths respectively.

Moreover, in another embodiment according to the invention, the detector also comprises anode subsets connected at least in pairs to a measuring anode path, whereof all the cathodes associated with the elementary sensors are segmented into several cathode subsets.

In this embodiment of the invention:
- the anodes are electrically interconnected so as to constitute a plurality of anode subsets which are electrically connected at least in pairs to a measuring anode path which is designed to be connected to the reading and operating circuit,
- each anode is connected to a single anode path,
- the cathodes are electrically interconnected so as to constitute adjacent cathode subsets which are each electrically connected to a measuring cathode path,
- the anodes belonging to two anode subsets and connected to a common anode path are associated with elementary sensors whereof the cathodes belong to separate cathode subsets.

In other words, the distinctive feature of this particular embodiment is the fact that each anode is connected to a single measuring anode path, rather than to two measuring anode paths as in the first embodiment described, and in one or the other of the two main directions of the two-dimensional set. There is therefore just one anode signal and one cathode signal in order to localise the elementary sensor, whereas the elementary sensor connected according to the first embodiment of the invention outputs two anode signals and one cathode signal.

This second embodiment of the invention uses the following physical phenomenon: when a ray, particle or electromagnetic wave interacts with a semiconductor material, this creates an electron cloud that has a certain mobility. It has been demonstrated that the dimensions of this cloud and its induction zone, created by it migrating into the material, generally exceed the dimensions of an elementary sensor so that the interaction in question is also capable of being detected by an elementary sensor adjacent to the sensor that is closest to the interaction site and is hence capable of being taken into account by an anode subset that does not necessarily interconnect the anode of the elementary sensor in question but generates at least a secondary electric anode signal. This secondary signal is received on an anode path that is different to the path that receives the main signal. The intensity of the secondary electric signal is different to that of the main signal outputted by the elementary sensor. Thus, with the aid of this secondary signal, the reading and operating circuit can precisely localise the site of interaction with incident radiation.

Because the anodes of this detector are only connected to one anode path and, as is evident, for instance, from FIG. 3, such a detector only requires a reduced number of measuring paths compared with a detector according to the prior art as explained but also compared with a detector according to the first embodiment of the invention wherein each anode must be connected to two measuring paths.

According to a first particular embodiment of the invention, the respective anode subsets interconnect the anodes in two adjacent rows and two adjacent columns in a broken line, with the interconnected anodes belonging alternately to one, then the other, of the two rows or two columns.

According to a second particular embodiment of the invention:
- first anode subsets extend parallel to the first main direction of the two-dimensional array set and, in particular, parallel to the columns, and interconnect one anode in two belonging to the same column, the number of said first subsets being equivalent to the number of elementary sensors that are present in the second direction of the array set,
- second anode subsets interconnect all the anodes that are present in said second direction and, in particular, along the same row and which are not interconnected by said first subsets.

According to the invention and regardless of the embodiment of the invention, the elementary sensors are organised in an array configuration whereof the two dimensions define mutually perpendicular directions. This embodiment has the advantage of simplifying analysis of the images obtained using the detector. The number of rows and the number of columns of these arrays can be identical or different.

According to the invention, the radiation detected consists of X-rays or gamma rays and the particles to be detected consist of alpha or beta particles or protons.

In addition and advantageously, the elementary sensors are made of a semiconductor material which is an alloy of cadmium, zinc and tellurium (CdZnTe). Nevertheless, other materials can be envisaged, such as CdTe:Cl, CdTe, CdHgTe, Si, Ge and, generally speaking, any semiconductor material with a high resistivity.

As is clear from this explanation, such a detecting device therefore substantially reduces the number of measuring paths required compared with detectors according to the prior art described earlier. Consequently, it also reduces the extent of the drawbacks mentioned earlier, especially in terms of the cost and overall size of these detectors, given the significant reduction in the number of connections in particular.

The invention will be more readily understood in the light of the following description of particular embodiments, reference being made to the accompanying Figures. The object of the invention is, however, not confined to these particular embodiments and other embodiments of the invention are possible.

DESCRIPTION OF THE PREFERRED EMBODIMENTS

Figure 2:
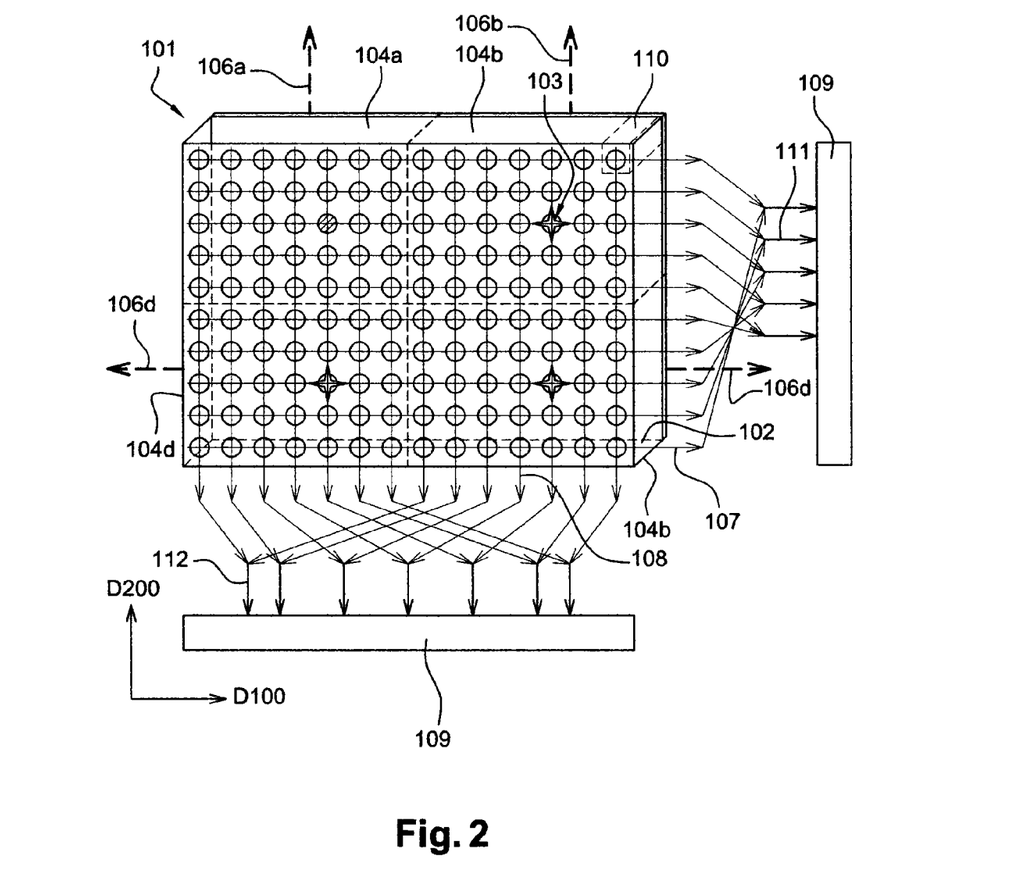
FIG. 2 is a schematic view of a detecting device in accordance with a first embodiment of the invention.

FIG. 2 illustrates a first embodiment of the invention. In this Figure, a detecting device (101) consists of a semiconductor type substrate (102), made of an alloy of cadmium, zinc and tellurium (CdZnTe) for example. Moreover, this device (101) is divided up into a two-dimensional set (D100, D200), in particular an array of juxtaposed elementary sensors. One of the sides of each of the elementary sensors is associated with an anode (103) and the opposite side is associated with a cathode (104).

Each anode and each cathode respectively is electrically connected to a signal read and operating circuit (109), which is in turn connected to a computer that is not shown here. The anodes in a single row in direction (D100) and in a single column in direction (D200) respectively of the array are electrically interconnected so as to constitute an anode subset (107, 108) which here is comparable a straight channel. The anode subsets (107, 108) are electrically connected to respective measuring anode paths (111, 112) in pairs for each measuring anode path (111, 112).

In the embodiment described here, each of the measuring anode paths (111 or 112) extending in the same dimension of the array (101) electrically connects two subsets, in this case anode channels (107, 108).

Also, the cathodes (104) of a single subset of elementary sensors are interconnected so as to constitute cathode subsets (104 a, 104 b, 104 c, 104 d). Each cathode subset (104 a, 104 b, 104 c, 104 d) is electrically connected to one measuring cathode path (106 a, 106 b, 106 c, 106 d). Cathode subsets (104 a, 104 b, 104 c, 104 d) are adjacent and separate, i.e. they have no common cathode and their aggregation forms a set that includes all the cathodes (104) of elementary sensors (110). Here, the number of cathode subsets (104 a, 104 b, 104 c, 104 d) equals four because two anode channels (107) are connected by measuring anode path (111) in direction (D100) and two anode channels (108) are connected by anode path (112) in direction (D200). Each cathode subset therefore aggregates elementary sensors that occupy a quarter of the surface area of the array.

When an incident ray interacts with an elementary sensor, it creates, inside the latter, an electron cloud which is capable of moving towards anode (103) associated with that sensor and thus being collected, at least partially, by that anode which is brought to a sufficient potential. An electric signal then flows through anode subsets (107, 108) that include the anode (103) associated with this sensor, in this case one row and one column. This signal is then received by measuring anode paths (111, 112). These signals are processed by electronic processing loops earmarked for each of these measuring anode paths (111, 112). However, operating circuit (109) cannot precisely localise the sensor that outputted these signals because each measuring anode path (111, 112) respectively is connected to two anode subsets (107, 108).

As shown in FIG. 2, four elementary sensors located at the point where said anode subsets (107, 108) intersect could have outputted these signals.

In order to eliminate this localisation uncertainty, the detector according to the invention is provided with adjacent and separate cathode subsets (104 a, 104 b, 104 c, 104 d) that have no common cathode. When a photon or particle strikes a sensor, it is absorbed and creates electron-hole pairs. These charges migrate into the material due to the effect of an electric field applied to said sensor. This migration causes the appearance of charges on electrodes which constitute the electric signals. In the example shown in FIG. 2, this is subset (104 b). Using this additional signal, operating circuit (109) can resolve the ambiguity and therefore precisely locate the elementary sensor involved in the interaction.

The detector described here has only seven measuring anode paths in dimension (D100), five paths in dimension (D200) and four measuring cathode paths. This makes a total of sixteen measuring paths rather than the one hundred and forty one or twenty five that are required using detectors according to the prior art having the same array characteristics. Obviously, the larger the dimensions of the array, the more attractive this reduction in the number of measuring paths and the cost and overall size of the detector as disclosed here become.

FIG. 3 shows a detector in accordance with a second embodiment of the invention. Anode subsets (208) interconnect anodes (203) in two adjacent rows and two columns in a broken line. In the example described, this involves interconnection of two columns. In addition, each anode subset (208) interconnects the anodes (203) that belong alternatively to one, then the other of the two columns.

Figure 4:
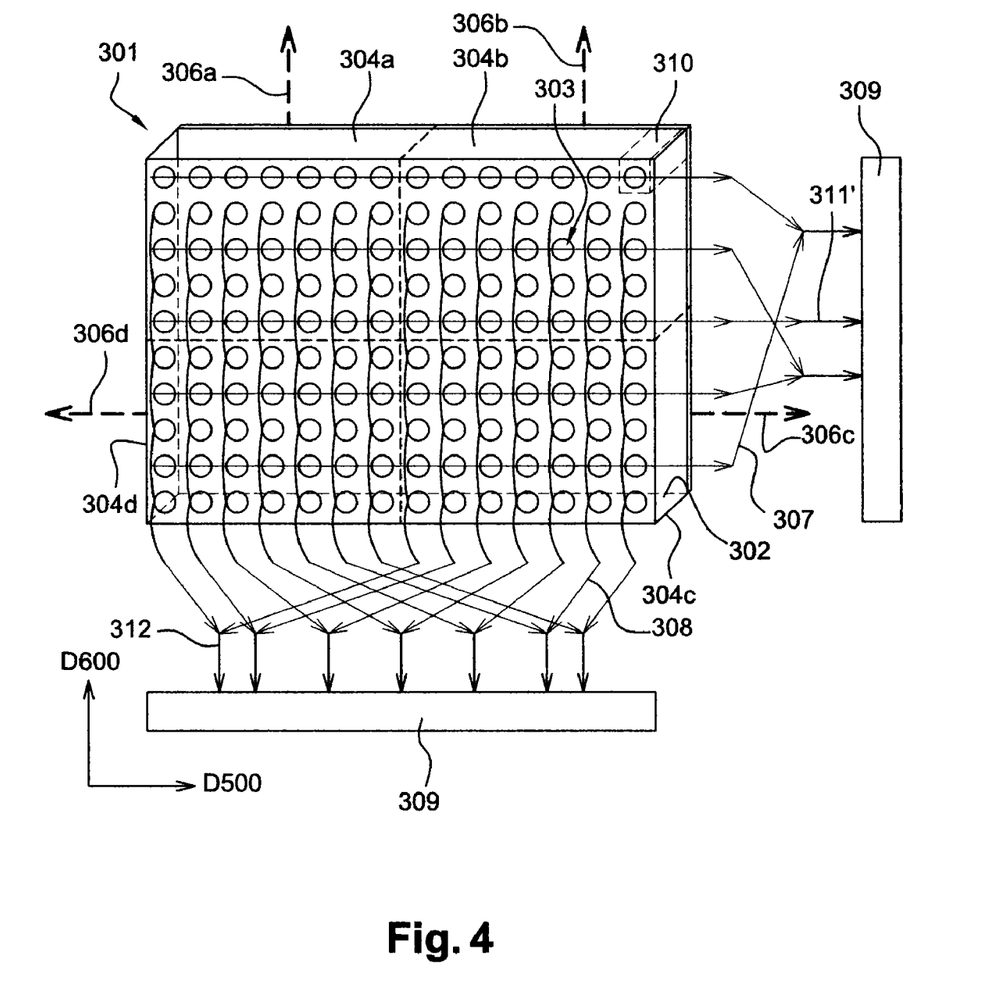
FIG. 4 is a view, similar to FIG. 2, of a third embodiment of the invention.

In a particular configuration of the second embodiment of the invention as shown in FIG. 4, the first anode subsets (308) extend substantially parallel to the second main direction (D400) of array (301) and interconnect one anode (303) out of two. Also, second anode subsets (307) interconnect all the anodes that are present in the second main direction (D400) of the array and only those anodes that are not connected by said first anode subsets (308).

Regardless of the configuration adopted in FIGS. 3 and 4, it is apparent that there is an additional decrease in the number of measuring paths compared with the first embodiment of the invention shown in FIG. 2.

The uncertainty associated with this new reduction in the number of measuring paths, anode paths in particular, is eliminated as follows: As stated earlier, the interaction of a ray, particle or electromagnetic wave with the semiconductor material of which the elementary sensors are made causes the creation of an electron cloud due to the release of covalent electrons subsequent to the energy input provided by the radiation or incident particle. This electron cloud has a certain mobility. In addition, its dimensions can exceed those of the elementary sensor. Generally speaking, the interaction in question is also detected by an elementary sensor adjacent to the sensor that is the closest to the interaction site and it is therefore collected by an anode subset other than the anode subset of the elementary sensor in question. This therefore creates a secondary anode electric signal that is capable of being received via an anode path other than that which receives the main signal, thus making it possible to precisely locate the site of interaction with incident radiation.

FIG. 5 illustrates an alternative version of the first embodiment of the invention. This differs from the version shown in FIG. 2 in that, in order to reduce the total number of measuring paths of the detector, one only interconnects two anode subsets to a common measuring path. In other words, it does not seem crucial to interconnect all the anode subsets or channels to common measuring anode paths in the present case.

In fact, several anode subsets (407', 407") are each connected to their own measuring anode path (411', 411") in isolated fashion. In other words, measuring anode paths (411') and (411") are each connected to a single anode subset (407') and (407") respectively. The operation of such a detector is readily understandable—it is actually a hybrid detector that comprises anode subsets which are connected to measuring anode paths, either in isolated fashion (407', 407") as for detectors according to the prior art as shown in FIG. 1, or in multiple fashion (407, 408), as for a detector in accordance with the invention as shown in FIG. 2. As shown clearly in FIG. 5, there is no uncertainty in localising an elementary sensor that interacted with a ray, regardless of the anode subset to which it belongs.

It is evident that such hybrid detectors require a smaller number of measuring paths than a detector according to the prior art but a larger number of measuring paths than a detector according to the invention as shown in FIG. 2. Such hybrid detectors are therefore only attractive in certain special cases.

From the sake of legibility as well as production convenience, the main directions of the various two-dimensional sets (101, 201, 301, 401) shown in the Figures are perpendicular to each other. They are therefore arrays. Nevertheless, a detector consisting of a two-dimensional set whereof the main directions are not mutually perpendicular would obviously also be in conformity with the invention explained here.

FIG. 5 illustrates an alternative version of the embodiment of the invention in FIG. 2 with the difference that the anode subsets are interconnected three by three (408) on each measuring path (412) in one main direction of the array (columns) and are interconnected two by two (407) in the other main direction of the said array (rows). In this case, six cathode subsets (404 a-404 f) are therefore needed in order to localise each elementary sensor that outputs an electric signal.

It is therefore clearly evident from the various embodiments of the invention shown in FIGS. 2 to 5 that the detecting device according to the invention significantly reduces the disadvantages of the prior art, especially in terms of the cost and overall size of the detectors, not to mention the number of connections.

The invention claimed is:

1. A device for detecting radiation consisting of particles or electromagnetic waves comprising at least one two-dimensional set of elementary sensors of semiconductor type for transforming energy of the radiation to be detected into electric signals, each of the elementary sensors being provided on one side with an anode and on an opposite side with a cathode, the anode and cathode being adapted to be electrically connected on a circuit for reading and operating on said signals, wherein:

anodes of said sensors are electrically interconnected so as to constitute a plurality of anode subsets, said anode subsets being electrically connected at least in pairs to a measuring anode path, said path being looped on said reading and operating circuit, each anode is connected to two separate measuring anode paths, cathodes of said sensors are electrically interconnected so as to constitute a plurality of adjacent cathode subsets, each of said cathode subsets being electrically connected to a measuring cathode path, and the anodes belonging to two anode subsets and connected to a common anode path are associated with elementary sensors whereof the cathodes belong to separate cathode subsets.

2. A device for detecting radiation as claimed in claim 1, wherein the number of cathode subsets at least equals the product of the number of anode subsets connected to a common measuring anode path in one of main directions of said at least one two-dimensional set times number of anode subsets connected to a common measuring anode path in an other main direction of said at least one two-dimensional set.

3. A device for detecting radiation as claimed in claim 2, wherein the anode subsets are connected in pairs to said measuring anode paths and the cathodes constitute four adjacent separate cathode subsets.

4. A device for detecting radiation as claimed in claim 1, wherein said at least one two-dimensional set comprises an array of said sensors extending in mutually perpendicular directions.

5. A device for detecting radiation as claimed in claim 1, wherein the two dimensions of said at least one two-dimensional set are equal.

6. A device for detecting radiation as claimed in claim 1, wherein the detected radiation consists of X-rays or gamma rays or alpha particles or beta particles.

7. A device for detecting radiation as claimed in claim 1, wherein the elementary sensors are made of a material chosen from the group consisting of CdZnTe, CdTe:Cl, CdTe, CdHgTe, Si, and Ge.

8. A device for detecting radiation as claimed in claim 1, wherein the two dimensions of said at least one two-dimensional set are different.

9. A device for detecting radiation as claimed in claim 1 wherein the sensors comprise semiconductor material having a high resistivity.

10. A device for detecting radiation consisting of particles or electromagnetic waves comprising at least one two-dimensional set of elementary sensors of semiconductor type for transforming energy of the radiation to be detected into electric signals, each of the elementary sensors being provided on one side with an anode and on an opposite side with a cathode, the anode and cathode being adapted to be electrically connected on a circuit for reading and operating on said signals, wherein:

anodes of said sensors are electrically interconnected so as to constitute a plurality of anode subsets, said anode subsets being electrically connected at least in pairs to a measuring anode path, said anode path being looped on said reading and operating circuit, each anode is connected to a single measuring anode path, cathodes of said sensors are electrically interconnected so as to constitute adjacent cathode subsets, each of said cathode subsets being electrically connected to a measuring cathode path, and the anodes belonging to two anode subsets and connected to a common anode path are associated with elementary sensors whereof the cathodes belong to separate cathode subsets.

11. A device for detecting radiation as claimed in claim 10, wherein:

the anode subsets interconnect the anodes in two adjacent rows and two columns in a broken line, and each anode subset connects the anodes that belong alternately to one, then an other of the two adjacent rows or the two columns.

12. A device for detecting radiation as claimed in claim 10, wherein:

first anode subsets extend parallel to a first main direction of the at least one two-dimensional set, parallel to columns, and interconnect one anode in two belonging to a same column, number of said first subsets being equivalent to number of elementary sensors that are present in a second direction of the array set, and second anode subsets interconnect all the anodes that are present in said second direction of the two-dimensional set and, in particular, along a same row and which are not interconnected by said first subsets.

13. A device for detecting radiation as claimed in claim 10, wherein said at least one two-dimensional set comprises an array of said sensors extending in mutually perpendicular directions.

14. A device for detecting radiation as claimed in claim 10, wherein the two dimensions of said at least one two-dimensional set are equal.

15. A device for detecting radiation as claimed in claim 10, wherein the detected radiation consists of X-rays or gamma rays or alpha particles or beta particles.

16. A device for detecting radiation as claimed in claim 10, wherein the elementary sensors are made of a material chosen from the group consisting of CdZnTe, CdTe:Cl, CdTe, CdHgTe, Si, and Ge.

17. A device for detecting radiation as claimed in claim 10, wherein the two dimensions of said at least one two-dimensional set are different.

18. A device for detecting radiation as claimed in claim 10 wherein the sensors comprise semiconductor material having a high resistivity.

* * * * *

UNITED STATES PATENT AND TRADEMARK OFFICE
CERTIFICATE OF CORRECTION

PATENT NO. : 7,659,515 B2  Page 1 of 1
APPLICATION NO. : 11/575535
DATED : February 9, 2010
INVENTOR(S) : Gros D'Aillon et al.

It is certified that error appears in the above-identified patent and that said Letters Patent is hereby corrected as shown below:

On the title page item (57), line 10, after "Each anode is connected to two separate measuring anode": Delete "pats" and insert -- paths --

Signed and Sealed this

Twenty-seventh Day of April, 2010

David J. Kappos
*Director of the United States Patent and Trademark Office*